United States Patent Office 3,585,053
Patented June 15, 1971

3,585,053
GLASS-CERAMIC ARTICLE AND METHOD
Hermann L. Rittler, Horseheads, N.Y., assignor to
Corning Glass Works, Corning, N.Y.
No Drawing. Continuation-in-part of abandoned application Ser. No. 365,199, May 5, 1964. This application Mar. 12, 1969, Ser. No. 806,740
Int. Cl. C03c 3/22
U.S. Cl. 106—39                         6 Claims

ABSTRACT OF THE DISCLOSURE

This invention relates to the strengthening of glass-ceramic articles in which the crystal content thereof comprises the predominant part of the articles and containing beta-quartz stuffed with magnesium ions as the primary crystal phase. The strengthening is secured through consecutive ion exchange reactions wherein lithium ions from an external source are first exchanged for magnesium ions in the beta-quartz within a surface layer on the article and thereafter sodium and/or potassium ions from an external source are exchanged for the lithium ions diffused into the structure of the beta-quartz during the first exchange. This consecutive ion exchange does not alter the essential structural nature of the beta-quartz crystals but does cause compressive stresses to be developed in the surface layer.

---

This application is a continuation-in-part of my pending application, Ser. No. 365,199, filed May 5, 1964, now abandoned.

A glass-ceramic article is produced through the crystallization in situ of a glass article resulting from a carefully controlled heat treatment thereof. Hence, the manufacture of glass-ceramic articles comprises three general steps: (1) a glass-forming batch commonly containing a nucleating agent is melted: (2) the melt is cooled and shaped into a glass article of a desired geometry; and (3) the glass article is exposed to a particularly-defined heat treatment which first promotes the development of nuclei in the glass that act as sites for the growth of crystals as the heat treatment is continued.

This substantially simultaneous growth of crystals on essentially innumerable nuclei imparts a structure to a glass-ceramic article consisting of relatively uniformly-sized, fine-grained crystals homogeneously dispersed in a residual glassy matrix. In general, the crystal phase constitutes the predominant part of the article and glass-ceramic articles are commonly defined as being at least 50% by weight crystalline. Many glass-ceramic articles are actually over 90% by weight crystalline. Such high crystallinity results in a product exhibiting chemical and physical properties that are usually quite different from those of the original glass but which are of a character very similar to those demonstrated by a crystalline article. Also, this high crystallinity results in the glass-ceramic article having a residual glassy matrix with a composition widely different from that of the parent glass since the components constituting the crystals will have been precipitated therefrom. An extensive discussion of the theoretical concepts and the practical considerations involved in the manufacture of glass-ceramic articles as well as a description of the structure thereof is set forth in U.S. Pat. No. 2,920,971.

It can be readily understood that the crystal phases grown in glass-ceramic articles are dependent upon the composition of the parent glass and the heat treatment to which the glass is exposed. Transparent glass-ceramic articles wherein the predominant crystal phase comprises beta-quartz "stuffed" with magnesium ions and, optionally lithium and/or zinc ions are described in U.S. Pat. No. 3,252,811, filed Dec. 11, 1963 in the name of G. H. Beall and assigned to the assignee of the instant application.

The diffusion of ions in any medium is a direct function of the structure of the medium itself. Hence, whereas a crystal has a long range ordered structure of ions, glass has only short range order and has even been deemed to consist of a random network of ions. This basic difference in structure greatly affects the ability of ions to diffuse therein.

The structure of glass is characterized by a network or framework composed of polyhedra of oxygen centered by small ions of high polarizing power (e.g. $Si^{+4}$, $B^{+3}$, $Al^{+3}$, $Ge^{+4}$, $P^{+5}$). These polyhedra are arranged in a generally random fashion so that only short range order exists. Thus silica glass is thought to be composed of a random network of $SiO_4$ tetrahedra, all of whose corners are shared with one another. In silicate glasses containing modifying oxides (e.g. $Na_2O$, $K_2O$, $MgO$, $CaO$, $BaO$, etc.) some of the shared corners (Si—O—Si bonds) are believed broken and oxygen ions are formed which are connected to only one silicon ion. The modifying ions remain in interstitial positions or structural vacancies. In modified aluminosilicate glasses, non-bridging oxygen ions are believed less common because as modifying ions are added to silicate glasses aluminum replaces silicon in the three-dimensional corner shared tetrahedral network and the modifying ions remain in the interstices with the retention of charge balance.

In either case the larger ions of lower valence (modifiers) are thought to occur geometrically in iterstititial positions within the basic silicate or aluminosilicate framework. They can thus be considered as completely or at least partially surrounded by linked framework silica tetrahedra. In other words, these ions can be considered as present in "structural cages" in the network.

Since the glassy network is random, the size of these cages or potential modifier cation positions is variable and the number of cages is large with respect to the number of modifying ions. Therefore, it is likely that during ion exchange in a molten salt bath a small ion will jump out of a cage and a large ion will jump into another cage, very possibly a larger one. Even if the exchangeable ion in the glass and the ions in the molten salt are similar in size, it is likely that an ion leaving one cage will be replaced by an ion entering a different and previously vacant cage. Thus ion exchange phenomena in a glassy network are structurally random and there is no guarantee that certain structural vacancies or positions filled before exchange will be filled after exchange.

The concept of exchanging ions within a crystal structure has been appreciated for many years. The term "ion exchange," as commonly used, refers to replacement reactions in clay and zeolite-type materials carried out in aqueous solutions at temperatures below 100° C. These materials generally consist of alternating, parallel, essentially two-dimensional layers which are stacked together with interlayer spaces therebetween. To maintain electroneutrality between these layers, cations are incorporated into the interlayer spaces. The extent and rate of exchange in these materials is a function not only of the concentrations of the exchanging species but also of the structure of the crystalline phase undergoing exchange. When these materials are suspended in an aqueous solution which can penetrate between the layers, these cations are freely mobile and can exchange with cations present in the solution. Hence, the cation exchange capacity of these materials arises principally from the replacement of cations at defined positions in the interlayer spaces. These interlayer spaces can be likened to channels and it will be apparent that this type of low temperature ion exchange will occur between the loosely bonded ions in a crystal and those in a solution only if there is a suitable channel within the crystal to allow diffusion to take place.

Isomorphous substitution in crystals involves the replacement of the structural cations within the crystal lattice by other cations. This type of substitution may be regarded as a form of ion exchange but the accomplishment thereof requires crystallizing the materials from melts of the appropriate composition. However, the amount and type of isomorphous substitutions can often be very important in affecting the character of a material which is to be subsequently subjected to the conventional low temperature ion exchange reaction described above.

The instant invention contemplates the use of high temperature ion exchange to effect substitutions within the crystalline lattice to thereby produce materials similar to those secured through isomorphous substitution. However, in contrast to glasses, high temperature ion exchange in crystals is much more restricted. The various ion species are specifically located in defined positions within the lattice. When an ion leaves a crystalline position, the position is generally filled by another ion from an external source of ions. The geometry of the crystals often restricts the size of the replacing ion. Isomorphous substitutions in the crystal can only sometimes be of help in determining which ion pairs are exchangeable under the rigid conditions imposed by the long range repetitive order of crystals. Thus, for example, sodium ions can replace lithium ions in the beta-spodumene crystal structure but this exchange cannot take place in the beta-quartz or beta-eucryptite solid solution structure where the sodium ion appears to be too large for the structure to tolerate and the crystalline structure is destroyed if the exchange is forced to take place. As opposed to this, the sodium-for-lithium ion exchange can always be carried out in aluminosilicate glasses without any phase change.

Hence, in short, crystals, because of their definite geometry, impose stringent limitations upon ion exchange. Glasses, on the other hand, because they are random structures capable of incorporating almost all chemical species in a substantial degree, demonstrate no such basic restrictions.

Of course, the ability of a crystalline phase to accept another cation to replace an ion already in its structure through an ion exchange mechanism is not necessarily useful. Many such exchanges will not lead to compressive stress and consequent strengthening. When strength is the desired goal, it is necessary to tailor the exchange to produce compressive stress in the exchanged layer. The compressive stress may arise through crowding of the existing structure or through transformation of that structure to one which comes under compression by some other mechanism; e.g., difference in coefficients of thermal expansion or density changes.

An application, Ser. No. 365,161, filed May 5, 1964, in the names of G. H. Beall and B. R. Karstetter and assigned to the assignee of the instant application, and now abandoned, discloses an ion exchange treatment of glass-ceramic articles containing beta-quartz stuffed with magnesium ions wherein magnesium ions in the stuffing position in the beta-quartz crystals are replaced with lithium ions. The application further discloses that such an ion exchange in a surface layer on the glass-ceramic article will develop compressive stresses in this layer and thereby produce an increase in the strength of the article. This lithium-for-magnesium ion exchange is carried out at temperatures of 800° C. and higher. However, although a very favorable degree of strengthening can be achieved in that exchange, there is a strong tendency at those high temperatures for the source materials of exchangeable lithium ions, such as molten lithium salts, to chemically attack the surface of the glass-ceramic article as well as container and handling equipment.

In order to alleviate this problem, I have attempted to effect the lithium ion exchange at temperatures below 800° C. However, the degree of strengthening attainable within practical periods of time ranging up to about 16 hours is relatively small. For example, whereas an increase in the abraded strength value of about 50,000 p.s.i. may be imparted to a glass-ceramic within about 4 hours at 800° C., a corresponding strength increase of about 12,000 p.s.i. was obtained after 16 hours treatment at 775° C.

I have now found that a lithium ion exchanged glass-ceramic article of the type disclosed in the previously mentioned Beall and Karstetter application can be further strengthened by a subsequent exchange of sodium or potassium ions for the lithium ions introduced by the initial exchange. This effect may be observed in materials treated at temperatures above 800° C., but is of particular significance below this temperature where such strengthening has been difficult to attain with the single treatment.

My invention then is a glass-ceramic article containing an original beta-quartz, crystal phase with magnesium ions in at least a portion of the crystal stuffing positions, the article being characterized by a surface layer wherein at least a portion of the magnesium ions in the beta-quartz crystals have been replaced by monovalent ions larger than lithium ions, particularly by potassium or sodium ions. The invention further resides in a method of increasing the strength of such glass-ceramic article which comprises replacing magnesium ions in the crystal by lithium ions and thereafter replacing such lithium ions by a larger monovalent ion, e.g., potassium or sodium ions. Preferably, the respective ion exchanges are effected at temperatures on the order to 750°–800° C. within a period of time not exceeding about 16 hours.

Reference to exchangeable sodium and potassium ions in this application indicates sodium and potassium ions that are capable of diffusing or migrating in depth under a chemical force such as is supplied by a differential ion concentration or under a physical force such as is supplied by heat and/or an electrical potential which are controllable by the application or removal of such chemical or physical influence. Since the ion exchange reaction is a diffusion-type process, the amount of exchange increases with the square root of time.

For purposes of the present invention, any beta-quartz type glass-ceramic wherein the beta-quartz crystals are in part at least stuffed with magnesium ions may be employed. The invention is not otherwise limited to any particular composition or method of production of the parent glass-ceramic article. In particular, it is not limited to the transparent materials disclosed in the Beall patent. However, it is described with reference to such materials because they represent a preferred embodiment and are illustrative of the generic family of compositions except for the unique property of transparency.

The Beall patent discloses that a magnesium stuffed beta-quartz glass-ceramic may be produced by melting, within a temperature range of 1600–1800° C., a batch of glassmaking materials suitably selected and proportioned to provide the essential oxides of magnesium, aluminum and silicon, zirconia ($ZrO_2$) as a nucleating agent, and optionally lithia ($Li_2O$) and zinc oxide ($ZnO$). The glass batch is melted and worked into articles of desired form in accordance with known glassworking practices. Thereafter, the glass articles are converted to the glass-ceramic state by suitable heat treatment within the range of 750°–1150° C. To permit deevlopment of a fine-grained, high quality, crystalline body without deformation, the heat treatment preferably involves holding the article at selected temperatures within the given range for periods of time to permit nucleation and crystal development to proceed fully.

The glass-ceramic article is then subjected to an ion exchange treatment whereby lithium ions are substituted for magnesium ions in the stuffing position of the beta-quartz crystal. Thus, the parent glass-ceramic article may be brought into contact with a material containing an exchangeable lithium ion, e.g. any ionizable lithium salt or mixture containing such salt. The salt or salt mixture is maintained in contact with the glass-ceramic at a temperature such that the ion exchange occurs between the magnesium and lithium ions and for a sufficient time to effect a desired degree of exchange.

For inherent strengthening as described in the Beall and Karstetter application, it is generally desirable to employ ion exhcange temperatures of 800° C. and above. However, as explained earlier, chemical reaction tendencies may become severe at such temperatures. Accordingly, while the present invention is not so liimted, it is particularly concerned with effecting the lithium for magnesium ion exchange at temperatures below 800° C. and preferably in the range of 750°–800° C.

While the invention is not limited to the use of molten salt baths, immersion of a glass-ceramic article in such a bath has proven a particularly convenient and effective means of achieving ion exchange. A particularly effective bath for present purposes is one containing a major proportion of lithium sulfate and a minor proportion of a sodium or potassium sulfate or acid sulfate, the lithium sulfate being the critical active ingredient in the initial ion exchange.

In accordane with the present invention, initial ion exchange is followed by a second or subsequent ion exchange wherein a portion of the lithium ions introduced during the initial exchange are replaced or substituted for by larger monovalent ions, in particular sodium or potassium ions. For this second exchange, it is also preferable to employ a molten salt bath and to again operate the bath at temperatures below 800° C., preferably in a range of 700°–800° C. For this purpose, a bath composed of 48% $K_2SO_4$ and 52% KCl, or the corresponding sodium salts, has been found both convenient and effective to use. Again, a time of at least 4 hours will normally be required, for a substantial increase in strength, while it is generally impractical and also unnecessary to carry the treatment beyond 16 hours.

By way of further illustrating the invention, the following specific illustrative embodiments are now described.

EXAMPLES I–IV

A glass batch was prepared from commercially available raw materials, the proportions being calculated on the basis of the following oxide formulation in parts by weight: 70.8 $SiO_2$, 18.6 $Al_2O_3$, 4.4 MgO, 1.9 $Li_2O$, 3.8 $ZrO_2$ and 0.5 $As_2O_3$. The glass was melted for a period of 16 hours at a maximum temperature of 1600° C. and worked into quarter-inch diameter cane. This was then cut into 4 inch lengths for strength testing purposes.

The glass cane thus produced was converted to the glass-ceramic state by heating at furnace rate, i.e., about 300° C. per hour, to 900° C. with the heating being interrupted to permit 4 hour hold periods at 780° C., 850° C., and a final 4 hour hold at 900° C., after which the material was rapidly cooled. The magnesium and lithium ion stuffed beta-quartz glass-ceramic cane samples thus produced were divided into several sets for subsequent ion exchange treatment.

Samples of the glass cane were examined through X-ray diffraction analysis and replica and transmission electron microscopy. These samples were all greater than about 70% by weight crystalline and contained stuffed beta-quartz as by far the predominant crystal phase. Vary minor amounts of spinel and cubic zirconia were present but the total thereof was estimated to be less than about 5% by weight.

Each set was initially immersed in a salt bath composed predominantly of lithium sulfate and diluted with potassium or sodium sulfate or acid sulfate. The treating bath was operated at a temperature of 775° C. and the period of treatment was either 4 or 8 hours. Thereafter, the set of samples was removed and cleaned and then introduced into a second bath composed of 48% potassium or sodium sulfate and 52% potassium or sodium chloride respectively. These salt baths were also operated at 775° C. This selection of identical times and temperature was, of course, a matter of convenience and of no particular significance.

After removal from the salt bath and cleaning, each cane sample was subjected to a severe form of surface abrasion. In this abrasive treatment, a set of cane samples was mixed with 200 cc. of 30 grit silicon carbide particles and subjected to a tumbling motion for 15 minutes in a Number 0 ball mill jar rotating at 90–100 r.p.m. Each abraded cane sample was then mounted on spaced knife edges in a Tinius Olsen testing machine and subjected to a continuously increasing load intermediate the supports and on the opposite side until the cane broke in flexure. From the measured load required to break each cane, a modulus of rupture (MOR) value was calculated for the individual cane and an average value determined for each set of samples.

Since the mechanical strength of these articles is a function of the surface compression layer developed thereon by means of the ion exchange process and, inasmuch as essentially all service applications for these articles will result in surface injury thereof even if only that undergone in normal handling and shipping, the permanent or practical strength exhibited by these articles is that which is retained after substantial surface abrasion. Therefore, the above-described tumble abrasion test was devised to simulate surface abuse which glass-ceramic articles might be expected to sustain in actual field service. The depth of the surface compression layer developed is, preferably, at least 0.001″ to assure reasonably good abraded strength to the articles. This depth can be measured through a light microscope and/or electron microscope examination of a cross-section of the article.

The following table summarizes a number of such ion exchange treatments in terms of the initial lithium salt bath composition (first bath), the nature of the salt used in the second salt bath (sodium or potassium), the times (in hours) of the respective ion exchange treatments, and the average MOR (in p.s.i.×10$^{-3}$) for the set having the particular indicated treatment.

| First bath | Second bath | Time | MOR |
|---|---|---|---|
| 1. 65% $Li_2SO_4$; 35% $KHSO_4$ | Potassium | 4–4 | 15 |
| | | 8–8 | 44 |
| 2. 75% $Li_2SO_4$; 25% $KHSO_4$ | Sodium | 4–4 | 16 |
| | | 8–8 | 32 |
| 3. 65% $Li_2SO_4$; 35% $KHSO_4$ | do | 4–4 | 9 |
| | | 8–8 | 33 |
| 4. 80% $Li_2SO_4$; 20% $KHSO_4$ | Potassium | 4–4 | 16 |
| | | 8–8 | 29 |

For purposes of comparison, abraded and untreated glass-ceramic samples will normally have a MOR value of about 8,000 p.s.i. After a 4 hour treatment at 775° C. in a lithium salt bath such as shown in the table, the MOR value on abraded cane samples is essentially unchanged, while with an eight hour treatment at this temperature the abraded MOR value is about 13,000 p.s.i.

EXAMPLE V

Cane samples of a second glass-ceramic material were produced in essentially the manner described above. This second glass-ceramic material was based on the following oxide composition in parts by weight: 47.5 $SiO_2$, 37.5 $Al_2O_3$, 15 MgO, and 12 $ZrO_2$. These canes were also greater than 70% by weight crystalline with stuffed beta-quartz comprising the great majority of the crystals. About 10% by weight spinel and about 5% by weight cubic zirconia were also present.

A set of quarter-inch cane samples of this glass-ceramic was immersed for 16 hours in a molten salt bath operating at 790° C. and composed of 75% $Li_2SO_4$ and 25% $K_2SO_4$. Thereafter, the set of samples was removed and cleaned and then immersed for 8 hours in a second salt bath operating at 800° C. and composed of 80% $K_2SO_4$ and 20% $Li_2SO_4$.

Following this second ion exchange treatment wherein potassium ions were substituted for the lithium ions introduced in the first salt bath treatment, the glass-ceramic cane samples were again cleaned and abraded in the manner described earlier. Each abraded sample was then load tested to destruction as before and individual and average MOR values calculated. The average abraded MOR for the cane samples treated in this manner was 59,600 p.s.i.

Whereas in Examples I–V baths of molten salts were employed as the sources of exchangeable lithium, sodium, and potassium ions and such baths certainly comprise the preferred method for performing the ion exchange process, it will be appreciated that other sources of exchangeable ions can be utilized which are operable at the temperatures required for this invention. Thus, the use of pastes and vapors is well-known in the commercial ion exchange staining arts. Further, although it will be apparent that the most rapid rates of exchange and, normally, the highest strengths will be effected where pure ion-containing materials are employed as the exchange media, some contamination thereof can be tolerated. However, the maximum amount of contamination that can be tolerated is an empirical determination which is believed to be well within the technical ability of a person of ordinary skill in the art.

This invention is based upon the exchange of lithium ions for magnesium ions in the crystal structure of stuffed beta-quartz followed by the exchange of sodium and/or potassium ions for lithium ions in the beta-quartz structure. That these exchanges do, indeed, take place is illustrated through X-ray diffusion analysis of the surface crystals before and after the ion exchange reactions. Thus, these exchanges can be demonstrated in the following table which records several of the $d$-spacings and the intensities reported thereat in X-ray diffraction patterns made of the surface crystallization of Example V prior to and subsequent to the ion exchange treatment. The intensities are arbitrarily represented as very strong (v.s.), strong (s.), moderate (m.), and weak (w.).

| Before exchange | | 75% $Li_2SO_4$-25% $K_2SO_4$, 16 hours at 790° C. | | 80% $K_2SO_4$-20% $Li_2SO_4$, 8 hours at 800° C. | |
| --- | --- | --- | --- | --- | --- |
| d | I | d | I | d | I |
| 4.48 | m. | 4.55 | s. | 4.53 | m. |
| 3.47 | v.s. | 3.51 | v.s. | 3.48 | v.s. |
| 2.98 | w. ($ZrO_2$) | 2.98 | w. ($ZrO_2$) | 2.98 | w. ($ZrO_2$) |
| 2.59 | m. | 2.61 | m. | 2.59 | w. |
| 2.33 | w. | 2.34 | w. | 2.33 | w. |
| 2.23 | m. | 2.26 | m. | 2.23 | w. |
| 2.07 | m. | 2.08 | m. | 2.07 | w. |
| 1.87 | v.s. | 1.88 | v.s. | 1.87 | m. |
| 1.82 | w. ($ZrO_2$) | 1.82 | w. ($ZrO_2$) | 1.82 | w. ($ZrO_2$) |
| 1.61 | s. | 1.63 | m. | 1.61 | m. |
| 1.40 | m. | 1.41 | m. | 1.40 | w. |

This table is believed to amply manifest that the fundamental structure of the stuffed beta-quartz crystals is maintained throughout the consecutive exchange process, inasmuch as the peaks in the diffraction pattern characteristic of the original beta-quartz crystals before the exchanges are still evident after the exchanges, but the spacings and intensities thereof are changed somewhat. These changes denote distortion and expansion of the crystal cell but not the destruction thereof and clearly indicate the result of crowding larger ions into sites within the crystals previously occupied by small ions.

Since the glass-ceramic articles of this invention are at least about 70% by weight crystalline, the amount of residual glassy matrix is very minor and the composition thereof quite different from that of the parent glass. Hence, in the preferred embodiment of the invention, substantially all of the alkali metal ions and magnesium ions will form part of the crystal phase present in the article, resulting in a residual glassy matrix composed principally of silica. Some alkali metal and magnesium ions in excess of those included in the crystal phase can be tolerated but amounts in excess greater than about 5% by weight frequently lead to melting and forming problems and hazard the development of a coarse-grained rather than a fine-grained glass-ceramic article. These "contaminant" alkali metal and magnesium ions in the residual glassy matrix can also, of course, be exchanged during the ion exchange processes, but, inasmuch as the number of such ions is very small and the total content of glass in the crystallized article is very small, it is believed apparent that the effect of any such exchange upon the properties of the article would be essentially negligible when compared to the effect resulting from the exchanges occurring within the beta-quartz crystals.

Therefore, since the alkali metal and magnesium ions are virtually absent from the residual glassy matrix of the glass-ceramic articles, the ion replacement reactions leading to the development of a surface compression layer must necessarily occur within the crystals. Nevertheless, although stuffed beta-quartz constitutes the great majority of the crystallization, minor amounts of other crystals can also be present. However, inasmuch as the existence of these extraneous crystals can dilute the maximum strength which can be achieved where stuffed beta-quartz constitutes the sole crystal phase, it is much preferred to restrict the quantity of all such incidental crystals to less than about 20% of the total crystallization.

From the foregoing description, it is readily seen that my invention provides a means of substantially increasing the strength, particularly the abraded strength, of a beta-quartz glass-ceramic article containing magnesium ions in the crystal stuffing positions. Numerous variations and modifications of the particular practices described will become readily apparent and are comprehended within the scope of the appended claims.

I claim:

1. A unitary glass-ceramic article of high strength wherein the crystal content thereof constitutes at least 70% by weight of the article and having an interior portion wherein the crystals consist essentially of beta-quartz stuffed with magnesium ions and an integral surface compressive stress layer wherein the crystals consist essentially of beta-quartz stuffed with magnesium ions, the structural nature of said latter beta-quartz crystals being essentially unchanged but in at least a portion of which the molar concentration of magnesium ions is less with a corresponding increase in the molar concentration of lithium and sodium and/or potassium ions.

2. A glass-ceramic article according to claim 1 wherein said interior portion consists essentially of MgO, $Al_2O_3$, $SiO_2$, and $ZrO_2$.

3. A method for making a unitary glass-ceramic article of high strength wherein the crystal content thereof constitutes at least 70% by weight of the article and having an integral surface compressive stress layer and an interior portion which comprises contacting a glass-ceramic article consisting essentially of MgO, $Al_2O_3$, $SiO_2$ and $ZrO_2$ and consisting essentially of beta-quartz stuffed with magnesium ions as the crystal phase at a temperature between about 750°–800° C. with a source of exchangeable lithium ions for a period of time sufficient to replace at least part of the magnesium ions of said beta-quartz in a surface layer of the article with lithium ions on a two lithium ion-for-one-magnesium ion basis and thereafter contacting said article at a temperature between about 700°–800° C. with a source of exchangeable sodium and/or potassium ions for a period of time sufficient to replace at least part of the lithium ions of said beta-quartz in said surface layer of the article with sodium and/or potassium ions, said replacements not changing the essential structural nature of the beta-quartz crystals but thereby effecting an integral compressively stressed surface layer on the article.

4. A method according to claim 3 wherein said interior portion consists essentially of MgO, $Al_2O_3$, $SiO_2$, and $ZrO_2$.

5. A method according to claim 3 wherein said glass-ceramic article is contacted with a soure of exchangeable lithium ions for an effective period of time not exceeding about 16 hours.

6. A method according to claim 3 wherein said glass-ceramic article is contacted with a source of exchangeable sodium and/or potassium ions for an effective period of time not exceeding about 16 hours.

References Cited
UNITED STATES PATENTS

| | | | |
|---|---|---|---|
| 2,779,136 | 1/1957 | Hood et al. | 65—30X |
| 3,282,770 | 11/1966 | Stookey et al. | 65—30X |
| 3,287,201 | 11/1966 | Chisholm et al. | 65—30X |
| 3,482,513 | 2/1969 | Denman | 65—33X |

S. LEON BASHORE, Primary Examiner

J. H. HARMAN, Assistant Examiner

U.S. Cl. X.R.

65—30, 33